(12) United States Patent
Fish

(10) Patent No.: US 11,506,242 B2
(45) Date of Patent: Nov. 22, 2022

(54) ENDPLAY OR PRELOAD SETTABLE LOCK NUT

(71) Applicant: TEMPER AXLE PRODUCTS CORPORATION, Fonda, NY (US)

(72) Inventor: Michael Fish, Fonda, NY (US)

(73) Assignee: TEMPER AXLE PRODUCTS CORPORATION, Fonda, NY (US)

( * ) Notice: Subject to any disclaimer, the term of this patent is extended or adjusted under 35 U.S.C. 154(b) by 0 days.

(21) Appl. No.: 17/367,817

(22) Filed: Jul. 6, 2021

(65) Prior Publication Data

US 2022/0034361 A1    Feb. 3, 2022

Related U.S. Application Data

(60) Provisional application No. 63/058,612, filed on Jul. 30, 2020.

(51) Int. Cl.
| | |
|---|---|
| *F16B 39/12* | (2006.01) |
| *F16C 25/06* | (2006.01) |
| *F16C 43/04* | (2006.01) |

(52) U.S. Cl.
CPC .............. *F16C 25/06* (2013.01); *F16B 39/12* (2013.01); *F16C 43/04* (2013.01); *F16C 2229/00* (2013.01); *F16C 2326/02* (2013.01)

(58) Field of Classification Search
CPC .......... F16B 39/06; F16B 39/08; F16B 39/10; F16B 39/12; F16B 39/34; F16C 25/06; F16C 43/04; F16C 2229/00; F16C 2326/02; Y10S 411/948

USPC .................. 411/204, 209, 216–218, 221, 222
See application file for complete search history.

(56) References Cited

U.S. PATENT DOCUMENTS

| | | | | |
|---|---|---|---|---|
| 7,625,164 | B2 * | 12/2009 | Rode ..................... | F16B 39/14 |
| | | | | 411/246 |
| 8,006,573 | B1 * | 8/2011 | Rode ..................... | F16C 25/06 |
| | | | | 73/862.23 |
| 8,016,531 | B2 * | 9/2011 | White .................... | F16C 19/548 |
| | | | | 301/105.1 |
| 8,403,611 | B2 * | 3/2013 | Friesen .................. | F16B 39/32 |
| | | | | 411/533 |
| 9,217,461 | B2 * | 12/2015 | Rode ..................... | B25B 27/14 |
| 9,566,699 | B1 | 2/2017 | Rode et al. | |

(Continued)

*Primary Examiner* — Roberta S Delisle
(74) *Attorney, Agent, or Firm* — Heslin Rothenberg Farley and Mesiti PC; Nicholas Mesiti

(57) ABSTRACT

A lock nut is useable for setting a bearing to preload or endplay. A plurality of preload markings are circumferentially spaced apart on the nut. The distance between the preload marking corresponding to a preselected amount of preload applied or reduced on said bearing when the nut is (i) tightened to apply a preload force to said bearing or (ii) loosened to reduce a preload force on said bearing, respectively. A plurality of endplay markings are also circumferentially spaced apart on the nut. The distance between the endplay markings, corresponding to a preselected amount of endplay increased or reduced in said bearing when the nut is (i) tightened to reduce endplay on the bearing or (ii) loosened to increase endplay in said bearing. The use of endplay and preload markings enables setting of a bearing on an axle or spindle to either an endplay setting or a preload setting by adjusting the rotation of the lock nut according to the endplay markings or the preload markings, respectively.

23 Claims, 11 Drawing Sheets

(56) References Cited

U.S. PATENT DOCUMENTS

| | | |
|---|---|---|
| 9,587,667 B2 | 3/2017 | Rode et al. |
| 9,599,164 B1 * | 3/2017 | Rode .................. F16C 19/548 |
| 9,764,453 B1 | 9/2017 | Rode et al. |
| 9,850,943 B1 | 12/2017 | Rode |
| 9,908,223 B2 | 3/2018 | Rode et al. |
| 9,909,609 B2 | 3/2018 | Rode et al. |
| 9,987,732 B2 | 6/2018 | Rode et al. |
| 10,086,505 B2 | 10/2018 | Rode et al. |
| 10,107,324 B1 | 10/2018 | Rode |
| 10,107,331 B1 | 10/2018 | Rode |
| 10,151,343 B2 | 12/2018 | Rode |
| 10,184,519 B2 | 1/2019 | Rode et al. |
| 10,436,247 B2 | 10/2019 | Rode |
| 10,493,605 B2 | 12/2019 | Rode et al. |
| 10,532,451 B2 | 1/2020 | Rode et al. |
| 10,690,174 B2 | 6/2020 | Rode et al. |
| 10,718,368 B2 | 7/2020 | Rode |
| 10,821,582 B2 | 11/2020 | Rode et al. |
| 10,837,489 B2 | 11/2020 | Rode et al. |
| 10,968,945 B2 | 4/2021 | Mesiti |
| 10,982,706 B2 | 4/2021 | Rode |
| 2006/0008340 A1 * | 1/2006 | Cox .................. F16B 39/32 |
| | | 411/432 |
| 2006/0133909 A1 * | 6/2006 | Jimenez .............. F16B 39/282 |
| | | 411/204 |

\* cited by examiner

ENDPLAY OR PRELOAD SETTABLE LOCK NUT

CROSS REFERENCE TO RELATED APPLICATION

This application claims priority to U.S. Patent Application Ser. No. 63/058,612 filed on Jul. 30, 2020 entitled "Endplay or Preload Settable Lock Nut", the entire disclosure of which is incorporated by reference.

The present invention relates generally to a lock nut useable on axles and spindles to secure wheel hub assemblies and for setting antifriction bearings to either the correct preload or desired endplay settings.

BACKGROUND OF THE INVENTION

Lock nuts are often utilized to retain a wheel or hub assembly, including axle bearings, on a shaft. Such lock nuts may be connected to a shaft to lock the assembly in place. For example, such systems are often utilized on motor vehicles, such as truck axles and wheel ends. Typically, a lock nut will be engageable with a locking or retaining member or keeper which inhibits movement of the nut relative to the shaft. The locking member may include a protruding portion which extends into a slot or receiving portion of a shaft. The locking member may also engage the nut such that there is little or no movement between the nut and shaft. After the nut is installed as specified for its particular application, the nut is locked to this specified position. Such a lock nut is shown in U.S. Pat. Nos. 7,303,367, 7,389,579 and 3,762,455.

Lock nuts may be used to maintain the wheel hub assembly and bearings therein at a particular state, namely, either a preload condition or an endplay condition. Preload exists when an axial compressive force is maintained on the bearings causing an axial compression and resultant compressive deflection of the bearings. Endplay exists when the bearing is not maintained in an axially compressed position via a force, but rather the bearing is allowed to move or "play" in the axial direction. The point where there is zero endplay and zero preload may also be obtained.

Various means have been devised to simplify the adjustment of axle bearings, specifically, truck axle bearings. It is generally accepted that in some bearing installations, for example, axle bearings, the life of the bearing will be optimized if they are set to a preload where the adjustment is made for a slight axial compressive deflection, for example, about 0.003 inches (where this amount is the compressive deflection of the two bearings combined), which is often referred to as "a three thousandths preload". Typical prior art methods of creating these preloads are obtained by applying specified torques to the bearing assembly, for example, by tightening the nut that retains the bearings. However, for several reasons, it is typically extremely difficult to achieve such preload settings under actual in-field conditions, such as in a mechanic shop. For example, the assembly of a heavy truck wheel onto a wheel hub assembly is a relatively cumbersome procedure that hinders the mechanic. Moreover, the wheel hub assembly typically includes at least one inner seal, usually a lip type of seal, which can impose a resistive drag torque component to the preload torque, particularly when the seal is new.

One means of adjusting bearing preload by means of an applied torque is described in the literature provided by the Stemco Company, of Longview, Tex. (for example, Stemco form 571-2970) and further in instructions provided by Stemco (for example, Stemco part number 09-571-0006). These instructions are typically packaged with Stemco's axle spindle nuts. The accuracy of this and other prior art preloading methods is limited because they rely on the relationship between assembly torque and axial preload of the bearings, which will vary with variations in torsional resistance or friction of the nut against the face of the bearing, and will also vary with variations in torsional resistance or friction of the nut against the spindle thread, the nut against the bearing face, and the aforementioned lip seal present in the assembly.

Other systems exist for preloading bearings. In particular, such systems permit the mechanic to monitor the preload during the preloading procedure to more accurately determine the actual preload provided. One such system offered by Temper Axle Corporation of Fonda N.Y. USA and sold under the designation Doctor Preload includes an apparatus for providing a preload to a bearing within a wheel hub assembly. The apparatus uses a frame supporting a member to allow the frame to move relative to the member and in an axial direction, a plurality of extensions extending from the frame towards a wheel hub assembly contact at least one of a wheel hub or a bearing of the wheel hub assembly when the member is attached to said threaded shaft. An adjustment mechanism is configured to move the frame and extensions axially towards the wheel hub assembly to apply a preload to a bearing within the wheel hub assembly. The extensions may be configured to contact the bearing of said wheel hub assembly. Such an adjustment mechanism may incorporate an automated adjustment mechanism configured to automatically regulate the preload supplied to the bearing. Such systems are shown in U.S. Pat. No. 10,436,247, the entirety of which is incorporated herein by reference.

In some axle bearings, instead of preload, it is desired or specified to set the bearings to a particular endplay, which is essentially the opposite of a preload, where no compressive force is maintained on the bearing so that axial movement or play in the bearings exists. In one example of setting a bearing and wheel assembly to endplay, a user may tighten a nut holding a bearing on a shaft to a particular torque to achieve a desired initial preload on the bearing of the wheel hub assembly and then such nut may be loosened to a particular position to achieve a desired endplay. Such a nut could be turned a particular portion of a rotation, e.g., loosened half a turn. Such an adjustment is a particularly inexact procedure given that wheel nut adjustment is desired to have precision of 0.001 of an inch while the degree of rotation of a nut as described is relatively inexact. The loosening of the nut will create an endplay in the bearing and the wheel hub assembly. The amount of endplay depends upon the particular bearing and wheel hub assembly. Typical desired endplay measurement are typically specified to be less than 0.005 inches, preferably less than 0.004 inches, more preferably less than 0.003 inches, and even more preferably less than 0.002 inches. The most preferred desired endplay measurement achieved in accordance with the present invention is about 0.001 inches, and up to 0.001-0.005 inches.

Excessive endplay may, in some situations, result in premature failure of the wheel hub assembly and bearings therein. Recent studies have indicated that a wheel hub endplay of 0.005 inches will reduce the life of bearings and a wheel hub assembly by 40% of its baseline. See *Understanding The Impact of Wide Base Single Tines on Axle and Wheel-End Systems*, Meritor White Papers, October, 2011. Moreover, too little endplay, which could result from excessively preloading the bearing and torqueing the retaining nut, may also lead to premature bearing failure. By utilizing an endplay measuring tool during such a wheel hub assembly and bearing setting to measure and set endplay at a desired amount, such as 0.001 inches. Such an endplay measurement tool is available from Temper Axle Corporation of Fonda, N.Y., USA.

So, in some instances, bearings and thus wheel hubs are specified to set to a particular final preload setting, while in other instances, bearings and wheel hubs may be specified to set to a particular final endplay setting. In addition, when bearings are set to endplay, they may also be initially preloaded during the installation process before the retaining lock nut is loosened to obtain a final endplay setting. In either situation, final endplay or preload setting, the wheel hub assemblies are held together using a lock nut, which helps maintain the bearings in either the final preload or endplay setting. Thus, the final locked position of the nut may affect the actual preload or endplay on the hub assembly and bearings.

Therefore, a need exists for a lock nut which can be used in setting wheel hub assemblies including those having a spacer therein, for obtaining and maintaining the wheel hub assembly and bearings either at a desired endplay or alternatively a desired preload, and for providing more accurate and repeatable procedures for setting and adjusting such wheel hub assemblies.

SUMMARY OF THE INVENTION

A lock nut useable for setting a bearing to either preload or endplay is therefore disclosed herein. The lock nut includes a nut threadably engageable onto a spindle or axle and a locking mechanism engageable with the nut and configured to prevent rotation of the nut threaded onto the axle or spindle. A plurality of preload markings are circumferentially spaced apart on the nut. The distance between the preload marking corresponds to a preselected amount of preload applied or reduced on the bearing when the nut is (i) tightened to apply a preload force to said bearing or (ii) loosened to reduce a preload force on said bearing, respectively. A plurality of endplay markings are also circumferentially spaced apart on the nut. The distance between the endplay markings corresponds to a preselected amount of endplay increased or reduced in said bearing when the nut is (i) tightened to reduce endplay on the bearing or (ii) loosened to increase endplay in said bearing. The endplay markings are visually different than at least a portion of the preload markings, and the nut enables setting the bearing on the axle or spindle to either an endplay setting or a preload setting by adjusting the rotation of the nut according to the endplay markings or the preload markings, respectively. The endplay and preload markings are spaced apart so that rotation of the nut will adjust the endplay or preload a specified preselected amount, based upon the thread pitch of the nut, when the nut is rotated between consecutive preload or endplay markings, respectively. The endplay markings are spaced apart substantially equidistantly but adjusted by moving one or more of the endplay markings a distance to the nearest preload marking location. So, the endplay markings are spaced apart substantially equidistantly from each other but adjusted so that each endplay marking is located at the same circumferential location as the closest preload marking.

The preload markings and endplay markings are preferably located on the axially outer face of the nut so as to be visual during installation of the nut. The lock nut may include a recessed surface adjacent the axially inner face, so that a preload adjustment tool may be used with the nut. The endplay markings may be at the same location of the nut as a portion of the preload markings. Some of the preload markings may be identical to the endplay markings. The locking mechanism may include a retaining ring and a keeper.

The lock nut may have a plurality of engaging teeth. The keeper may have a plurality of keeper teeth engageable with the engaging teeth of the nut to inhibit movement of the keeper relative to the nut when the engaging teeth engage the keeper teeth. The keeper may have a radially inner side configured to engage a shaft to inhibit rotational movement of the nut relative to the shaft when the engaging teeth engage the keeper teeth and the radially inner side engages the shaft and when the retaining ring is secured to the keeper. The retaining ring is engageable with the nut to hold the keeper axially. The retaining ring extends continuously in an arc from a first outside end to a second outside end and the keeper located between said first end and said second end.

The inner side of the keeper comprises a shaft engaging member engageable in a shaft slot of an axle or spindle shaft to inhibit rotational movement of the nut relative to the shaft. The lock nut may include a slot and the retaining ring has at least one leg configured to be received in the slot. The retaining ring is configured to hold the keeper axially relative to the nut such that the engaging teeth and keeper teeth are engaged when the at least one leg is received in the slot. The at least one leg may be two legs elastically deformable toward one another to allow the retaining ring to be attached to the nut by inserting the two legs in the slot. The lock nut may include a shoulder portion and the keeper is received on the shoulder portion such that the keeper is axially supported by the shoulder portion. The keeper teeth form an arc having a first outer end and a second outer end, and the keeper teeth extend from the first end to the second end. The retaining ring is located axially between the keeper and the outer surface of the nut. The lock nut may further include a circumferential rim. The retaining ring may be located at an axial center of the outer surface and engage the rim to hold the keeper axially such that the engaging teeth and keeper teeth are engaged and the keeper abuts the shoulder.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention will be readily understood from the following detailed description of aspects of the invention taken in conjunction with the accompanying drawings in which:

DETAILED DESCRIPTION OF THE INVENTION

In accordance with the principles of the present invention, a lock nut useable for setting a wheel hub assembly and wheel bearings mounted on a shaft, axle or spindle is provided.

The lock nut includes a series of preload markings circumferentially and equally spaced around the outer face of the nut. The preload markings allow the nut to be loosened to where the next consecutive preload marking aligns vertically or with an alignment mark on a preload adjustment tool. The lock nut also includes a plurality of endplay markings circumferentially spaced apart equidistantly along the outer face of the nut. The endplay markings allow the same lock nut to be used to adjust the lock nut to maintain the bearings and wheel hub to a desired range of endplay. When the nut is used for endplay the nut may be loosened, a preselected specified amount depending upon the particular application and specifications. For example, for a particular application the nut can be specified to be rotated the distance between endplay markings, to where the nearest preload marking aligns vertically at zero degrees aligns with an alignment mark typically located at zero degrees measured from the top point of a vertical line exiting through the center point of the nut. Also, for example, for another particular application the nut can be specified to be rotated to the next endplay marking to align the same vertically at zero degrees or with an alignment mark on an adjustment or measurement tool.

Because the nut has both endplay and preload markings thereon, the same nut may be used to set the wheel hub to either a final preload or endplay setting. And, adjustment of the nut in either situation may be achieved visually by loosening the nut the distance between endplay markings, or to the next consecutive endplay or preload marking. The lock nut allows the nut to be loosened during the installation process to the next endplay marking to achieve the industry standard 0.001-0.005" endplay. Or, in a preload use, the nut may be loosened to the next preload marking to allow the retaining ring to be properly installed (where the retaining ring or keeper teeth preferably mesh with the nut teeth when a protrusion to the keeper is aligned in a slot of the shaft) in the nut without significantly affecting the desired preload.

Figure 1:
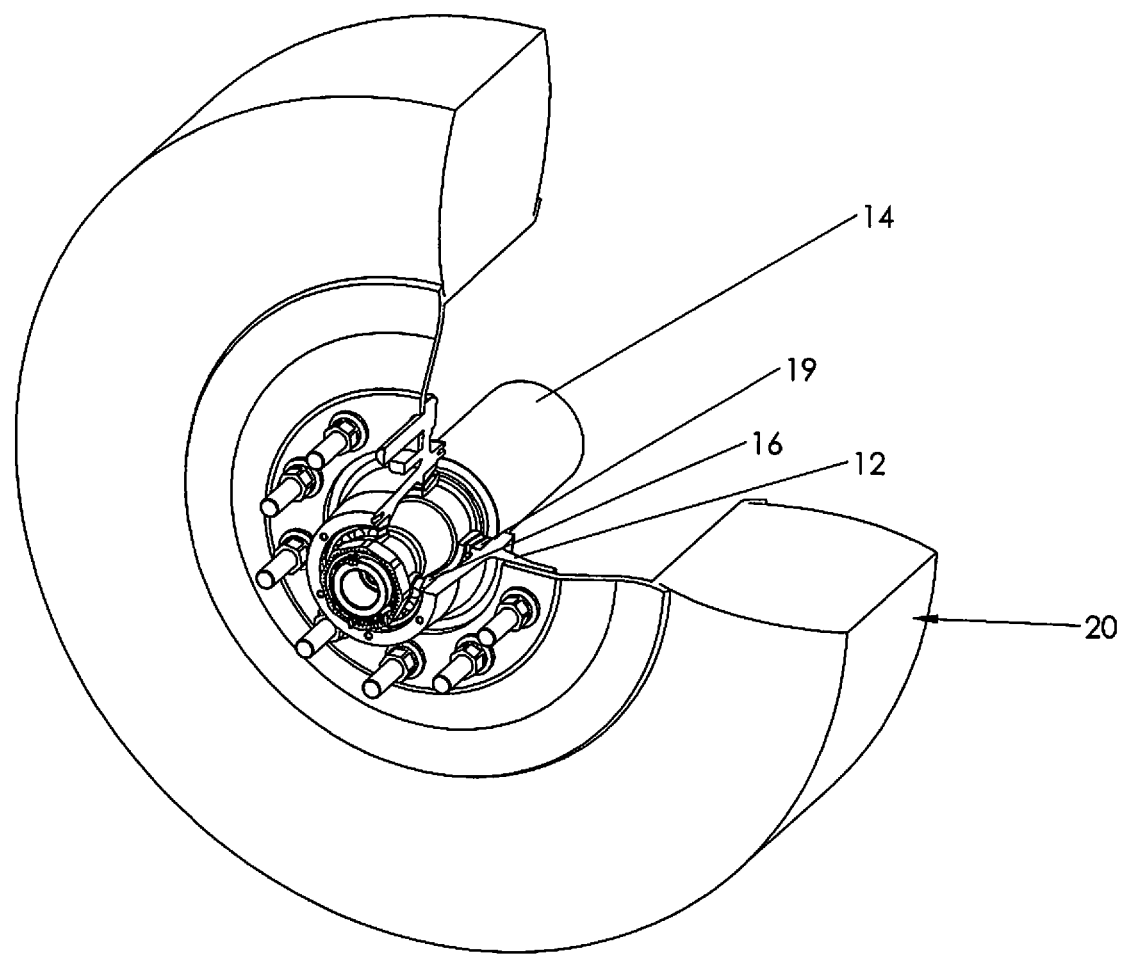
FIG. 1 is a perspective sectional view of a wheel hub assembly mounted on a shaft or spindle, with a wheel attached, for implementation of setting a bearing using the lock nut in accordance with the present invention.
Figure 2:
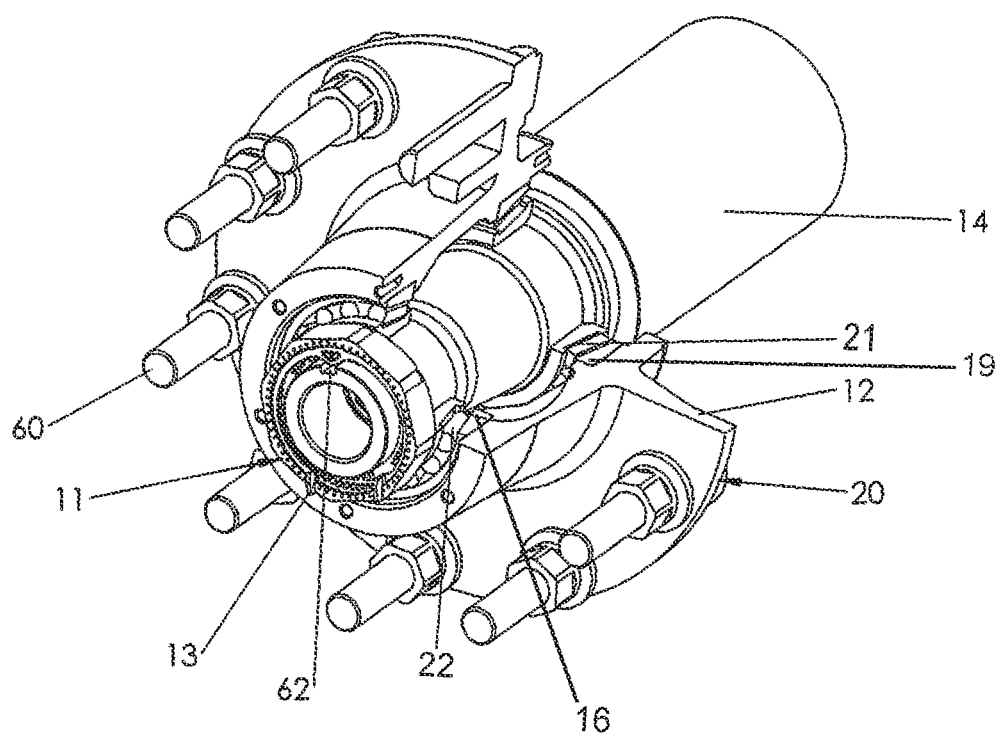
FIG. 2 is a perspective sectional view of the wheel of FIG. 1 without the wheel thereon.

The lock nut is useable in, for example, a wheel hub assembly 20, as shown in FIGS. 1 and 2, which would typically be found on a front or rear axle of a cab or tractor of a tractor-trailer, or an axle of a trailer. However, the lock nut may be used to retain bearings and bearing assemblies in any machine or device that employs bearings, including, but not limited to, power trains, transmissions, machine components, on and off-road vehicles, aircraft wheels, marine drives, spacecraft, conveyor rolls, and windmills, among others. According to aspects of the present invention, the lock nut may be used in these and any other spacer assembly for which bearing preload and/or endplay is desired, including, for example, any assembly that utilizes thrust and radial load carrying bearings that are indirectly mounted.

Figure 3:
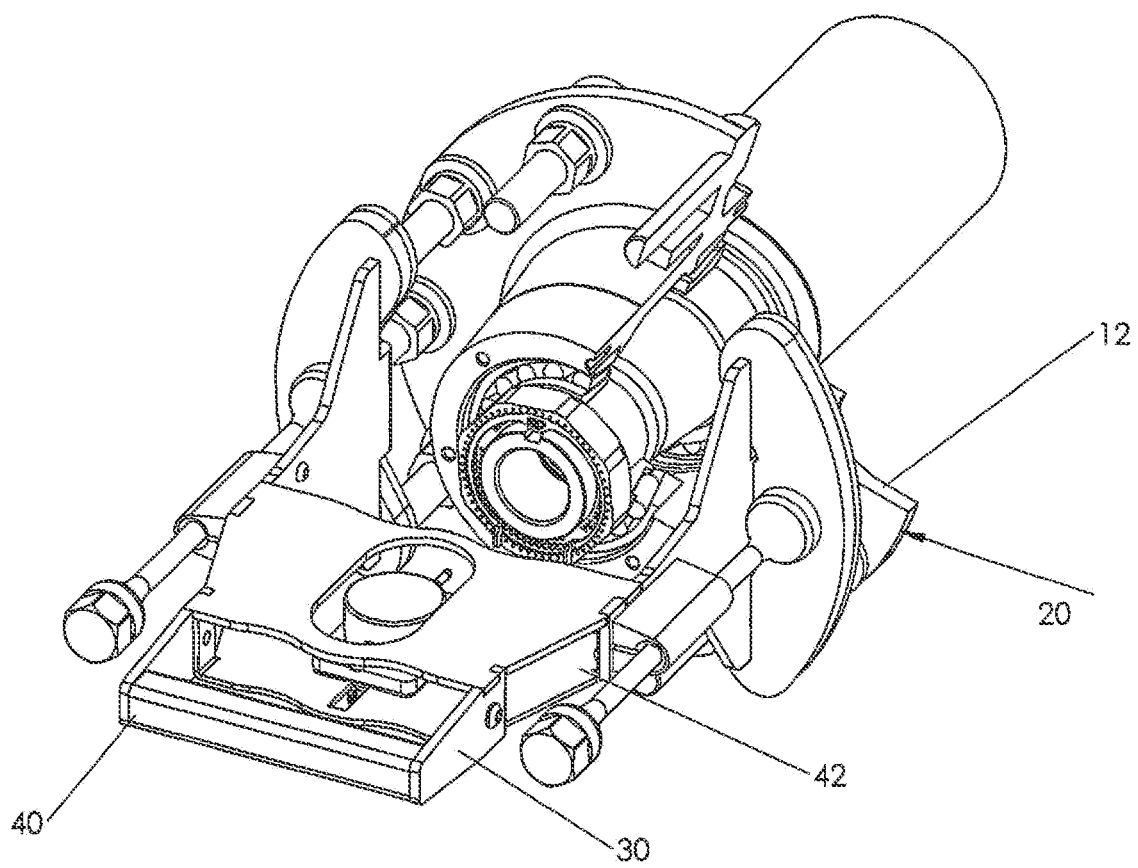
FIG. 3 is a perspective sectional view of an endplay measuring tool, lock nut and adjustment wrench mounted on the wheel hub of FIGS. 1 and 2 useable to set the bearings within the wheel hub assembly and measure endplay.

As shown in FIGS. 1-3, for example, wheel hub assembly 20 includes a wheel hub or, simply, a hub 12, a threaded spindle, axle, or a shaft (hereinafter "spindle") 14. As is typical, spindle 14 is mounted with two antifriction bearings 16, 19, a spacer (not shown) may or may not be mounted therebetween, and spindle 14 includes an exposed end 13, which is typically threaded on the outside diameter and is partially hollow at the end. The lock nut 11 (FIG. 2) may be threaded to exposed spindle end 13 to retain hub 12 thereon.

As shown in FIG. 2, as is typical of bearings, outboard bearing 16 includes an inner race (or cone), an outer race (or cup), a plurality of rollers 22, and a roller cage (not shown). Similarly, an inboard bearing 19 includes an inner race (or cone), an outer race (or cup), a plurality of rollers 21, and a roller cage. The details of an inboard bearing and an outboard bearing are described and depicted in co-owned U.S. Pat. No. 7,303,367, issued Dec. 4, 2007 (application Ser. No. 11/029,531 filed Jan. 5, 2005), entitled "Lock Nut System"; U.S. Publication No. 2007/0177829A1, published Aug. 2, 2007, (application Ser. No. 11/341,948 filed Jan. 27, 2006), entitled "Method and Apparatus for Preloading a Bearing"; and U.S. Pat. No. 7,389,579, issued Jun. 24, 2008 (application Ser. No. 11/354,513, filed Feb. 15, 2006), entitled "Method, Apparatus, and Nut for Preloading a Bearing", the entirety of which are incorporated herein by reference.

The lock nut 11 may be a lock nut substantially as disclosed in co-owned U.S. Pat. No. 7,303,367 (application Ser. No. 11/029,531 filed Jan. 5, 2005), entitled "Lock Nut System"; U.S. Publication No. 2007/0177829A1 (application Ser. No. 11/341,948 filed Jan. 27, 2006), entitled "Method and Apparatus for Preloading a Bearing"; and U.S. Pat. No. 7,389,579 (application Ser. No. 11/354,513, filed Feb. 15, 2006), entitled "Method, Apparatus, and Nut for Preloading a Bearing", and U.S. Pat. No. 8,961,090 entitled "Axle Nut". In another example, lock nut could be a locking nut as disclosed in U.S. Pat. No. 3,762,455 to Anderson Jr. Each of U.S. Pat. Nos. 8,961,090; 7,389,579; 7,303, 369 and 3,762,455 are incorporated herein by reference in their entireties. Bearings 16, 19 may be a tapered roller bearing, or to other types of antifriction bearings for which it is desirable to provide preload and/or endplay, for example, spherical roller bearings, deep groove ball bearings, and the like.

Shown in FIGS. 5-10 is an exemplary embodiment in accordance with aspects of the invention, of a TP type lock nut which includes a nut 11, a keeper 30 and a retaining member 40, as depicted in FIGS. 5-10. Lock nut 11 may be useable on a spindle 14. In particular, threads 50 of nut 11 may engage threads of the spindle 14. Keeper 30 and retaining member 40 may engage nut 11 and keeper 30 may engage the spindle 14 to inhibit movement of the shaft relative to nut 11. A TP lock nut typically has a thread pitch of 12 threads per inch.

Figure 5:
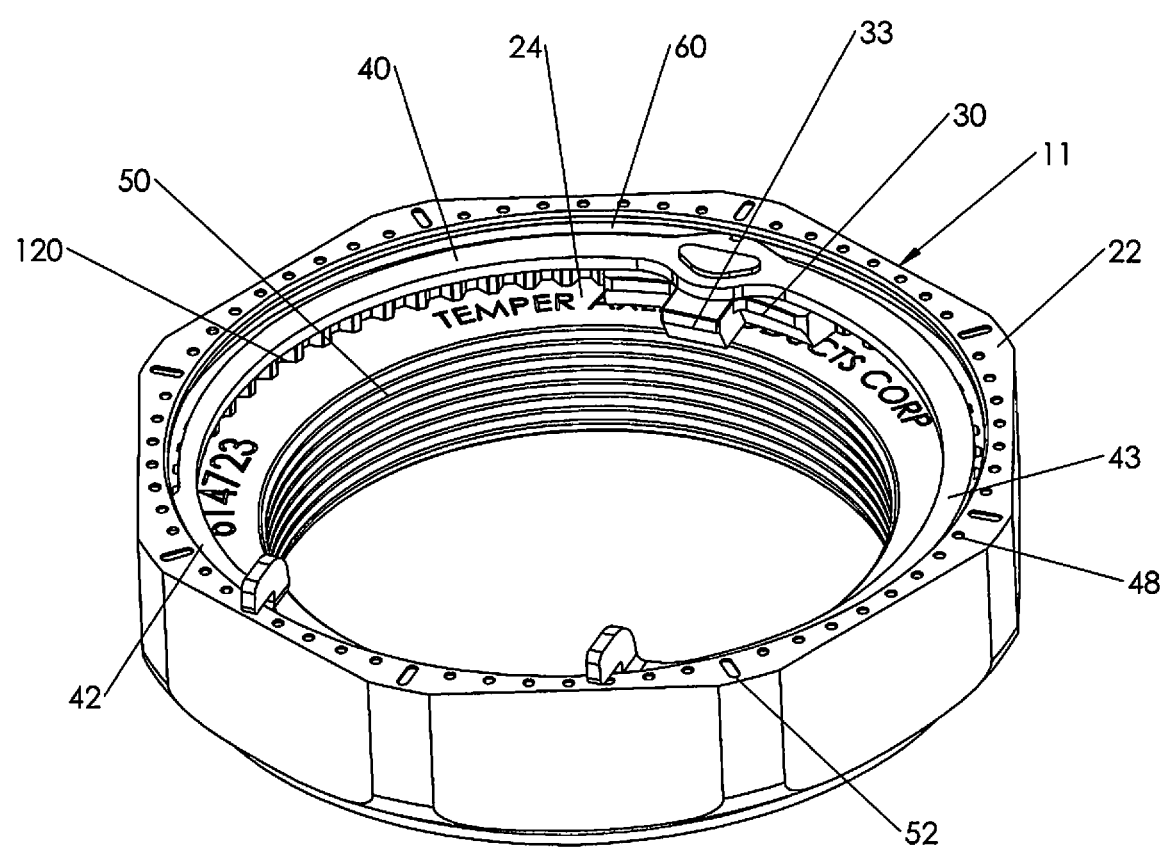
FIG. 5 is an orthogonal view of an axle nut according to one aspect of the invention.
Figure 6:
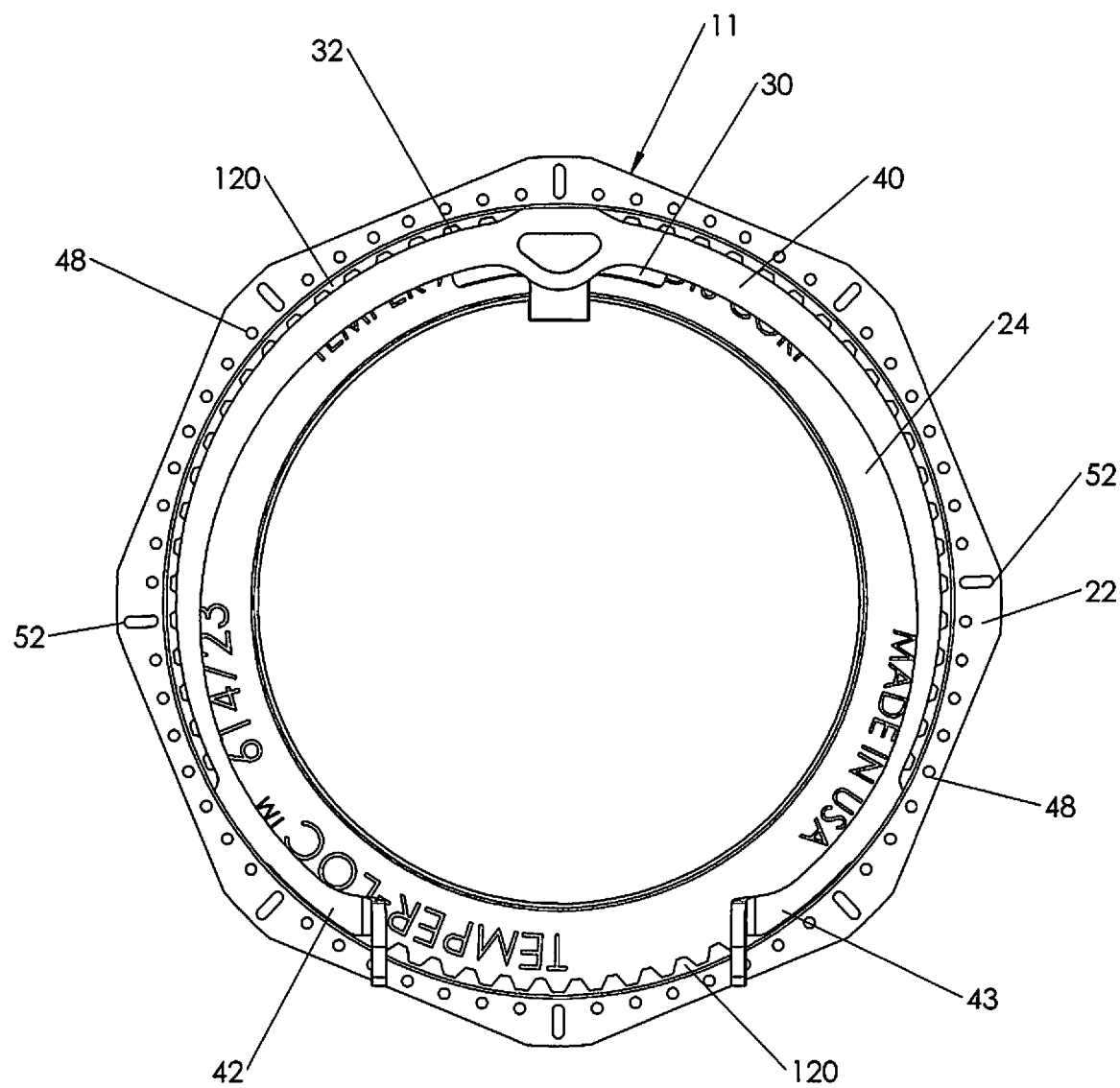
FIG. 6 is front view of the axle nut of FIG. 5.
Figure 7:
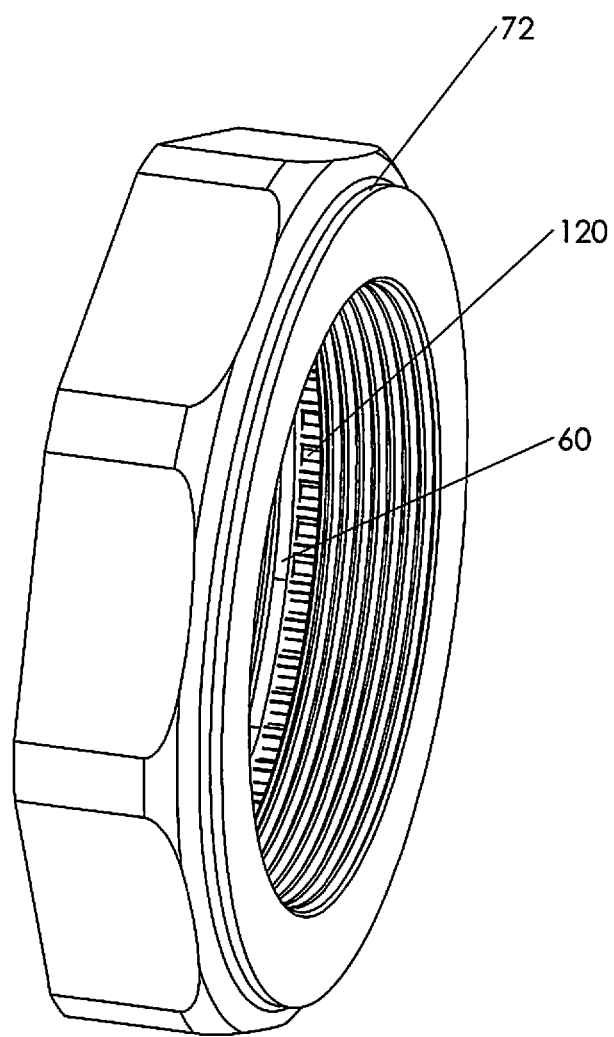
FIG. 7 is an orthogonal view from the back of the axle nut FIGS. 5 and 6.

Referring to FIGS. 5-10, nut 11 may include a plurality of nut engaging teeth 120 extending circumferentially around an inner radial surface of nut 11. For example, nut 11 may include 60 engaging teeth. As shown in FIGS. 5 and 6, nut 11 may also include a shoulder 24 configured to receive keeper 30. For example, shoulder 24 may extend circumferentially and face in the axial direction opposite the wheel bearing and assembly. The shoulder 24 may be spaced from an outer surface 22 of nut 11 in an axial direction relative to nut 11 such that keeper 30 is received between outer surface 22 and shoulder 24. Shoulder 24 may also abut and support keeper 30 in an axial direction. Nut 11 may be molded or formed of powdered metal, for example. As described below, shoulder 24 of the nut 11 may include a slot 60 to receive the retaining member 40.

Figure 8:
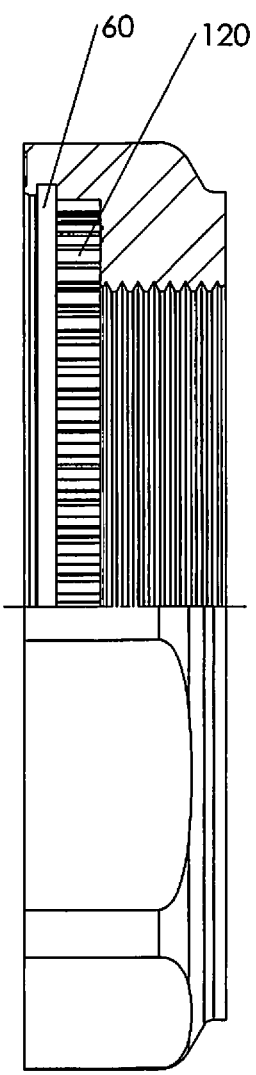
FIG. 8 is a side elevation view, partially in cross section, of the axle nut shown in FIGS. 5-7.
Figure 9:
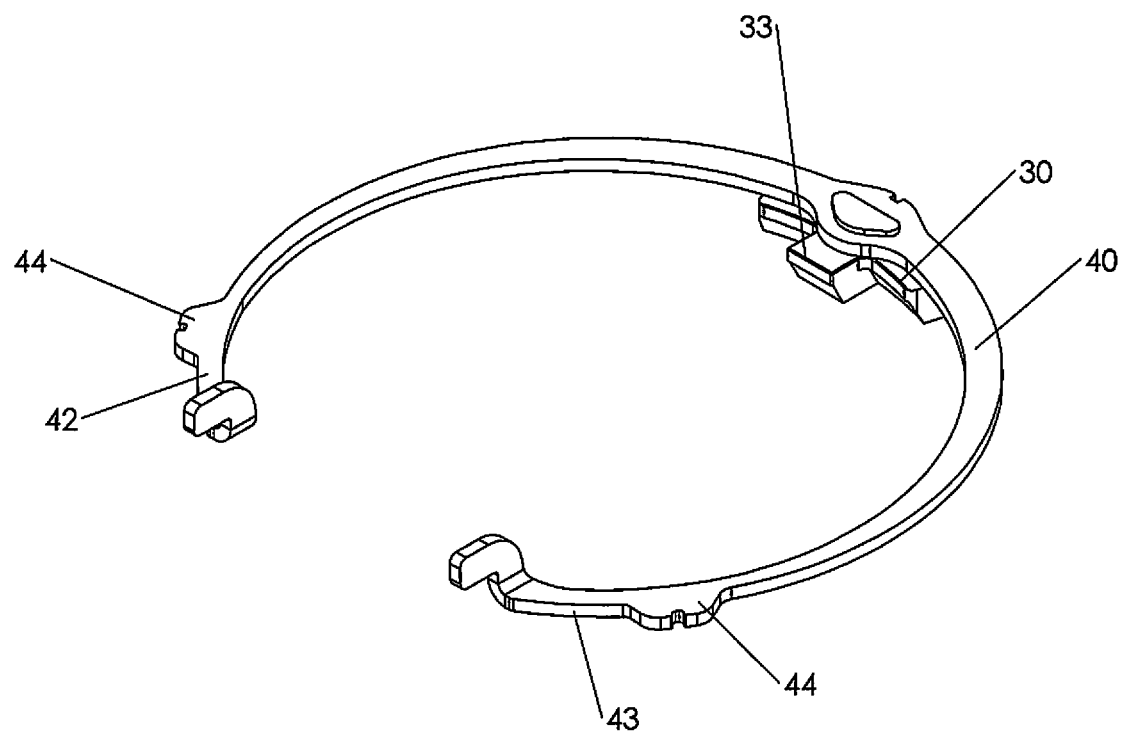
FIG. 9 is an orthogonal view of the retaining ring of the axle nut of FIGS. 5-8.

Referring to FIGS. 5, 6 and 8, nut 11 may include a slot 60 extending circumferentially (e.g., completely or partially) around nut 11. Slot 60 may be located between nut engaging teeth 120 and outer surface 22 of nut 11. Also, slot 60 may have a radial depth sufficient to receive and retain retaining member 40. Retaining member 40 may engage slot 60. For example, a first leg 42 and a second leg 43 may be received in slot 60. Further, a tab 44 of retaining member 40 may be received in slot 60.

Figure 10:
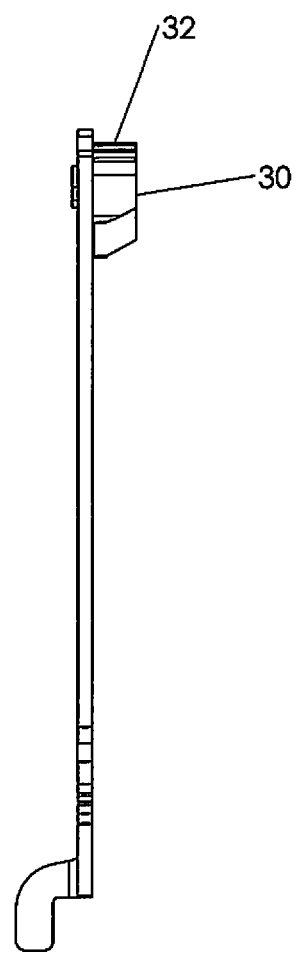
FIG. 10 is a side view of the retaining ring of FIG. 9.

As shown in FIGS. 6 and 10, keeper 30 may include a plurality of keeper teeth 32 configured to engage nut engaging teeth 120 of nut 11 such that movement between keeper 30 and nut 11 is inhibited when keeper teeth 32 and nut engaging teeth 120 are engaged to each other, such as when the retaining member 40 and keeper 30 are locked onto the nut as shown in FIG. 6. The keeper 30 retaining member 40 or ring, together with the nut teeth 120, and keeper teeth are part of a locking mechanism which locks the nut in place when assembled.

Referring to FIGS. 2, 5 and 6, retaining member 40 may include a spindle or shaft engaging side having, for example, a protrusion or key 33 configured (e.g., shaped and dimensioned) to engage the shaft or spindle 14 (FIG. 2) by, for example, fitting within a recess such as, for example, a slot or keyway 62 on the spindle 14 to inhibit movement (e.g., rotational movement) of the shaft relative to keeper 30. When threads 50 of nut 11 engage threads of the spindle, keeper teeth 32 may engage nut engaging teeth 120, and the key 33 of keeper retaining member 40 may engage slot 62. For example, the engagement or meshing of keeper teeth 32 and nut engaging teeth 120 inhibits movement of keeper 30 relative to nut 11 and the engagement of key 33 with the spindle inhibits movement between keeper 30 and the spindle thereby inhibiting movement between nut 11 and the spindle. Keeper 30 may include, for example, about seven keeper teeth 32 evenly spaced from one another, for example. Also, keeper teeth 30 on outer circumferential sides 35 of keeper 30 may have an axial height (i.e., relative to nut 11) substantially equal to a distance from shoulder 24 to outer surface 22. Keeper teeth 32 on an inner portion of keeper 30 may have a height substantially equal to a distance from shoulder 24 to slot 60 thereby allowing tab 44 of retaining member 40 to extend into slot 60. More specifically, keeper teeth 32 on an inner portion have an axial height less than keeper teeth 32 on outer sides 35. The reduced axial height on inner portion allow tab 44 to pass over teeth 32 to extend into slot 60.

In a further unillustrated embodiment, keeper 30 could extend partially or entirely circumferentially around nut 11 (e.g., abutting shoulder 24) and could include keeper teeth 32 around an entire outer circumference of keeper 30, which therefore could engage some or all of engaging teeth 120.

Retaining member 40 may be elastically deformable to allow it to be received in slot 60. For example, first leg 42 and second leg 43 may be deformed (e.g., in a direction substantially perpendicular to the axis of nut 11) toward one another prior to being inserted axially past outer surface 22 of nut 11 to allow retaining member 40, and keeper 30 to be attached thereto. First leg 42 and second leg 43 may then be elastically returned toward slot 60. For example, retaining member 40 may be formed of ASTM A228 spring steel as will be understood by those skilled in the art. Also, retaining member 40 may be cylindrical or otherwise arcuately shaped. Alternatively, retaining member 40 could be formed of other materials and/or formed in other shapes to allow retaining member 40 to receive in slot 60 and/or cavities (e.g. cavity 36 and cavity 38) of keeper 30.

As shown in FIGS. 2 and 6, keeper 30 functions to engage with the teeth 120 of the lock nut 11 so as to allow retaining member 40 to fit into slot 60 of the nut and lock the nut 11 into position on the spindle 14. Further, keeper 30 may be formed or molded of powdered metal, for example. Also, keeper 30 could be formed in different shapes to allow it to engage a shaft to thereby inhibit movement of such spindle. For example, spindles or other shafts may have different shaped recesses or keyways 62 and the keeper 30 should be shaped so that its protrusion or key 33, for example, fits within the recess or keyway 62 to prevent relative rotation therebetween.

Retaining member 40 when received in slot 60 may align keeper 30 such that keeper teeth 32 are engaged with the nut teeth 120. Further, retaining member 40 when received in slot 60 provides resistance in an axial direction relative to nut 11 thereby inhibiting movement of keeper 30 axially away from shoulder 24 toward outer surface 22. The lock nut is locked into position on the spindle when protrusion or key 33 is within keyway 62 62, retaining member is in slot 60 of the nut, and nut teeth 12 and keeper teeth 32 are meshed together.

Although the aforementioned description describes one preferred construction of a lock nut, other constructions including other locking mechanisms or techniques may be useable in conjunction with aspects of the present invention.

In accordance with principles of the present invention and referring to FIGS. 5 and 6, the nut 11 is marked with a plurality of preload marks 48, which, for example, may be in the form of dots or any other form. The preload marks are equidistantly spaced on the outer surface face 22 of the nut to assist the user in determining if the retaining ring 40 and keeper teeth 32 will mesh with the nut teeth. In a typical TP nut, as shown, there are preferably sixty six preload markings. Each marking representing about 5.45 degrees of rotation therebetween. Each preload marking 48 is located at a position on a radial line in between the middle of, and equidistant between, adjacent nut teeth 120. Also, each preload mark 48 is located at a position on a radial line extending from the center of the shaft to the middle of a gap between nut teeth 120, and in the middle of a radial line extending from the center of the shaft through the center of a corresponding keeper tooth 32 which fits within such gap. If the locking nut 11 is rotated on the spindle 14 to its proper preload setting, as disclosed in U.S. Pat. Nos. 8,961,090 and 8,904,646, which are each incorporated by reference herein in their entireties, the position of the retaining ring 40 may not allow the nut teeth 120 to align and mesh with the teeth 32 on the keeper 30. This situation typically occurs when the protrusion or key 33 of the keeper 30 when aligned in the slot 60 of the spindle 14 (FIG. 2) is such that the teeth 32 of the keeper and nut teeth 120 do not perfectly align or mesh. To alleviate this situation the lock nut 11 should be loosened by rotation so that the teeth align. This perfect alignment situation occurs when one of the preload markings 48 on the nut aligns with a marking on the preload adjustment tool (not shown). The spacing between the preload markings 48 are selected so that rotational movement of the nut 11 between consecutive preload markings 48 will adjust the preload on the bearings a specified amount such as for example, 0.0013 inches. Thus, when adjusting the final position of the nut 11 by loosening the nut 11 (so that the preload adjustment tool marking aligns with the preload marking), the final preload on the bearings will still be within specified tolerance range, for example, 500-1,000 lbs. However, depending on the application, the distance between preload markings may be selected to achieve a different preselected preload adjustment when the nut is loosened or tightened the distance between preload markings.

Figure 11:
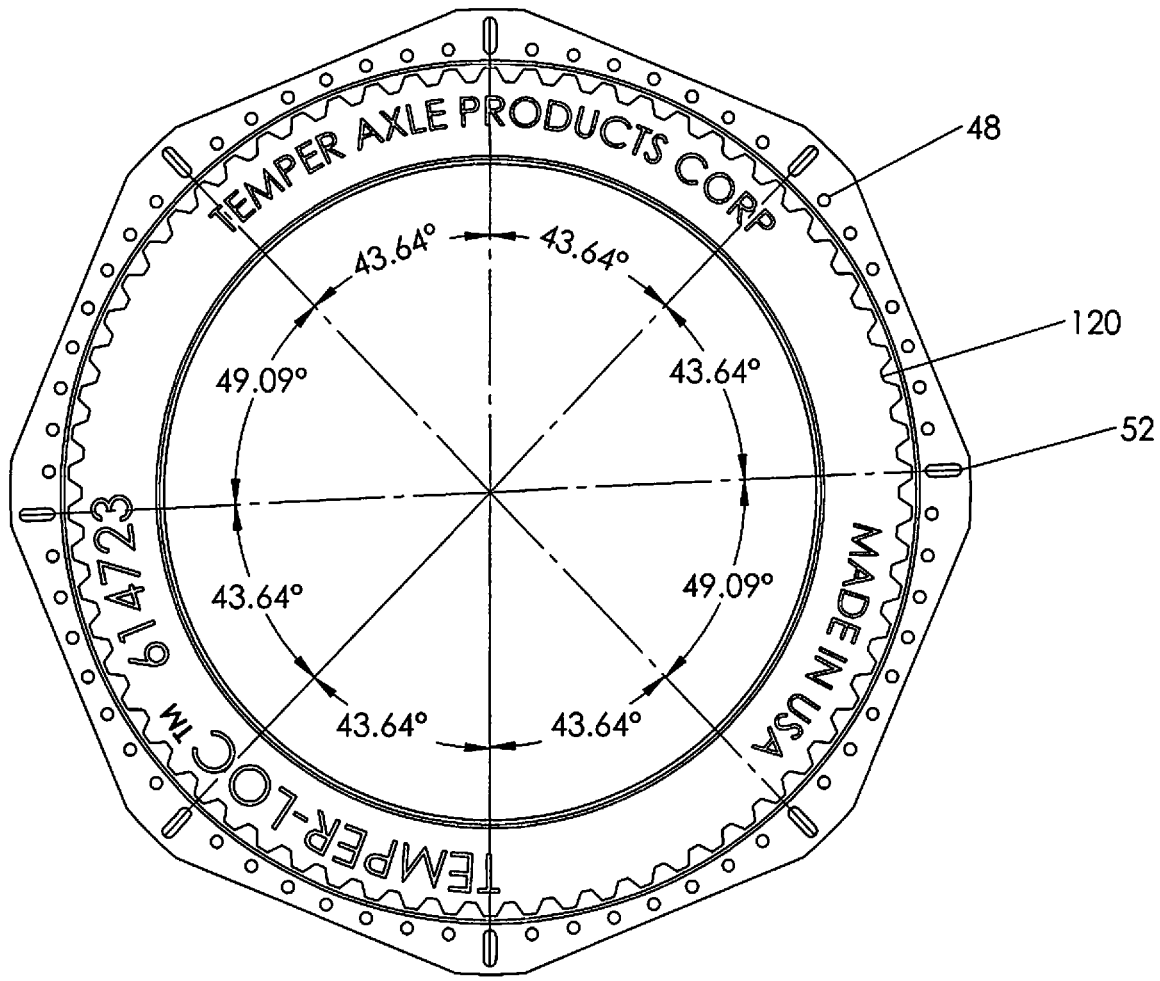
FIG. 11 is a front view of the axle nut of FIGS. 5-8, showing the circumferential locations of the endplay markings.

The markings on the face 22 of the nut 11 also include endplay markings 52. And, some of the endplay markings 52 may also correspond and function as preload markings. Preferably, the endplay markings 52 may be in the form of ovals or any other form where they can be visually distinguished from the preload markings 48. For the TP nut shown herein, eight oval endplay markings 52 are almost equidistantly spaced along the face 22 of the nut 11 so that the spacing is near forty five degrees between such markings. The endplay markings are spaced as close to equidistantly spaced (e.g., 45 degrees for 8 endplay markings) as possible. However, the endplay markings should be located at the same position as a preload marking, so that the nut teeth 120 align with the keeper teeth 32 when the endplay marking is properly aligned. This will allow the retaining ring to lock the lock nut into position. Therefore, when placing the endplay marking on the face of the nut, the endplay markings are placed at the same circumferential location as the nearest preload marking located at the position closest to the circumferential location on the face of the nut 11 where the endplay marking would be located if such markings were equidistantly spaced (e.g., 45 degrees for 8 markings). Thus, each endplay marking 52 is also located at the same position as, and thus also functions as, a preload marking 48. And referring to FIGS. 6 and 11, all the endplay markings are located at: 0 degrees, the same location as the 8th consecutive preloading marking, the 16th consecutive preload marking, the 25th consecutive preload marking, the 33rd consecutive preload marking, the 41st consecutive preload marking, the 49th consecutive preload marking, the 58th consecutive preload marking, at the 66th preload marking (located at zero degrees). Thus, the endplay markings, 52 starting from the marking at 0 degrees and directed clockwise, are spaced apart, 43.64°, 43.62°, 49.09°, 43.64°, 43.64°, 43.62°, 49.09° and 43.64°, respectively.

The spacing between endplay markings are selected so that rotational movement of the nut 11 between consecutive endplay markings will adjust the endplay (by reducing or increasing endplay, by tightening or loosening the nut, respectively,) on the bearing a specified amount, for example, about 0.010 inches. Rotating the lock nut 11 between adjacent endplay markings 52 of the TP nut, based upon the standard TP nut thread pitch, will adjust the endplay by, for example, 0.010 inches. Thus, the nut 11 may be installed in such a way that if the nut 11 is initially set to a preload condition, but then loosened to a desired endplay setting of, for example, 0.001-0.005 inches, loosening of the nut by rotation of the nut to the next adjacent endplay marking will result in an endplay of within 0.001-0.005 inches. The selection of the spacing between endplay markings may be dependent upon the torque specified for the lock nut for a particular assembly as well as the desired final endplay setting. And, such selection could be different depending on the application.

As is known in the art, a known preload, for example, the 6000 pounds results in a known value of axial compression of a bearing, for example, an axial compression of 0.004 inches. According to aspects of the invention, in the load reference point position, where both bearings are correctly aligned and at zero preload on nut 11, the preload on inboard bearing 19 will be captured by or transferred to nut 11 if nut 11 is loosened, for example, precisely 0.004" from the load reference point. Therefore, according to aspects of the invention, the preload may be varied or the endplay provided by precisely controlling the rotation of nut 11. Loosening of the nut by rotating it more than 0.004" from the load reference point will result in a transfer of the setting from a preload condition to an endplay condition. One aspect of the present invention provides a technique for monitoring the rotation of nut 11 to provide a desired preload or endplay, using the preload and/or endplay markings.

Using the Nut for Endplay Settings

Typically endplay is specified to be less than 0.005 inches and preferably 0.001 inches. Such an amount may result in maximum wheel bearing life. Some have reported that an endplay measurement of 0.005 inches will result in a wheel bearing life of approximately 60% of the life that would be achieved with an endplay measurement of 0.001 inches. Accordingly, an endplay measurement of less than 0.005 inches to 0.001 inches is preferred, but closer to 0.001 inches may be most preferred. When the desired endplay setting is reached, e.g., 0.001 inches, the retaining nut 11 may be locked in its position and the bearing setting procedure is completed.

For example, the process of using the TP nut 11 disclosed herein to set a wheel hub and bearing assembly such desired endplay range is as follows: with a wheel on the spindle 14, the nut 11 is initially threaded onto the axle 14 or spindle at a torque of 200 ft-lbs. Then, the wheel hub 12 is rotated at least one revolution. Then, the nut 11 is retorqued to 200 ft-lbs and the hub 12 rotated again at least one revolution. Then, the nut is retorqued to 200 ft-lbs. The nut 11 is then backed off until it is loose. Then, a torque of 100 ft-lbs is applied to the nut 11. And, the hub 12 is rotated at least one revolution. The, the nut is retorqued to 100 ft-lbs and the hub is rotated at least one revolution. Then the nut is retorqued to 100 ft-lbs. At this point, the wheel hub and bearings are set to a preload condition of about 4,000 lbs. Then, the final step to achieve the desired endplay is to loosen the nut 11 to the distance between endplay markings, e.g. about 45° to where the nearest preload marking is perfectly vertically aligned with the center of the keyway 62. Then, the retaining ring 40 can be engaged to the lock nut 11 to lock the nut into position. The endplay can then be checked using and endplay measurement tool (as shown in FIG. 3) and as previously discussed above. The endplay should be within 0.001-0.005 inches.

Since the maximum endplay between markings is 0.010 inches, using the above technique will result in an endplay of between 0.001-0.005 inches, depending upon the actual amount of final rotation of the nut. However, the spacing between endplay markings, is preselected based upon the desired hub assembly specifications including nut thread pitch, the torque and/or preload initially applied to the nut to initially set the bearings, typical wheel end assembly tolerances, and the desired final endplay setting desired. When installing and/or assembling a spacered wheel hub assembly, the manufacturer typically specifies that the retaining nut be adjusted to a specified torque, to achieve a particular endplay or preload setting, or a specified endplay or preload setting. So the distance between endplay marking will depend, in part, on such specifications.

Figure 4:
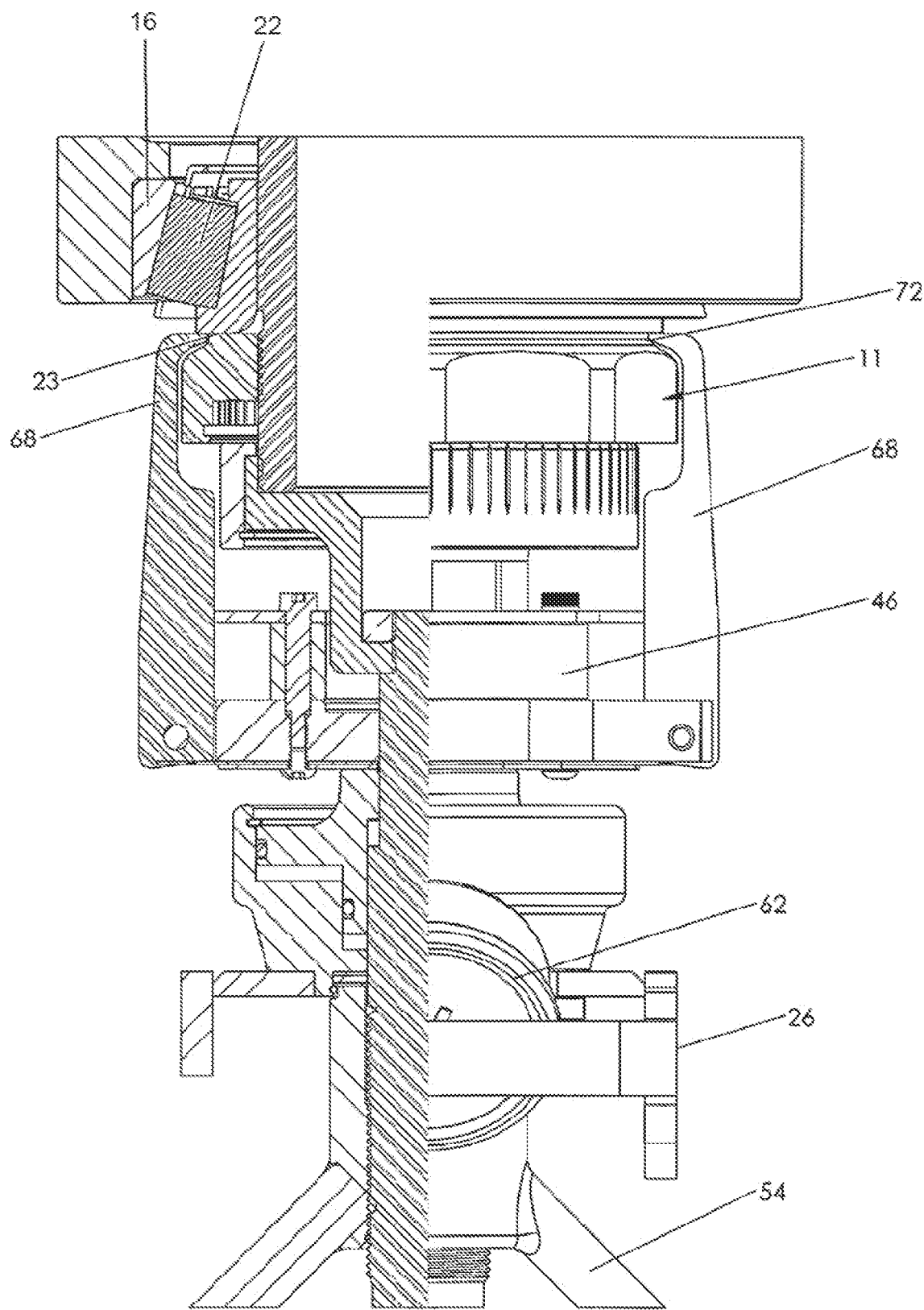
FIG. 4 is a detailed view of preload adjustment tool for providing a preload onto the bearings of a wheel hub spindle assembly with a lock nut thereon.

The setting of other wheel hub assemblies may require additional or different steps than those set forth herein to result in a desired endplay of the wheel hub assembly. Thus, an endplay adjustment procedure may be required to obtain an endplay less than 0.005 inches, 0.004 inches, 0.003 inches, 0.002 inches, and/or about 0.001. The lock nut herein may be used in such situations by preselecting the spacing between endplay markings 52 based upon thread pitch of the nut, torque specified to the nut, initial preload or endplay setting of the nut, and desired final endplay setting. Moreover, the lock nut herein may be used with spacers other than manufacturer's specified spacers including replacements of spacers and/or bearings in the wheel hub assembly 20. Such replacement procedures may require that endplay be measured with, for example, a dial indicator to assure a safe adjustment had been achieved (FIG. 4). An endplay measuring tool as disclosed in U.S. patent application Ser. No. 13/400,227 filed on Feb. 20, 2012 and entitled "Systems and Methods for Measuring Bearing Endplay", which is incorporated by reference in its entirety, may be used to measure the endplay in a wheel hub assembly and the bearings therein, in accordance with the lock nut therein.

Using the Nut for Preload Setting

In one aspect, the nut 11 may be used to set an assembly to preload using a preload apparatus 26 as shown in FIG. 4 and as disclosed in U.S. Pat. No. 10,436,247, which is incorporated herein by reference in its entirety. In a typical procedure, the wheel (not shown) is mounted to hub assembly 12, for example, mounted to studs on hub. As shown in FIG. 4, nut 11 may be loosened or hand tightened prior to mounting apparatus 26. Preload apparatus 26 is then mounted to hub assembly 12 by means of collar 46. Arms 68 of the preload apparatus wrap around the recess 72 on the inner face of nut 11 so that the tip of the arms contact the outer face 23 of the bearing. The loading of bearing 16 is initiated by advancing arms 68 by turning handle 54. The buildup of force on bearing 16 via arms 68 is indicated by a pressure indicator 62 and may be monitored by the technician or mechanic. The turning of handles 54 continues until the target pressure and thus initial preload of 4000 lbs is achieved. Then the wheel hub is rotated 3 revolutions. Then, the handles are turned to reduce the preload to 1000 lbs. then, the nut 11 is hand tightened and the apparatus 26 removed.

Upon completion of the above preloading, apparatus 20 may be removed from wheel hub assembly 10 when the desired preload is achieved; the nut may then be locked into position on the shaft. However, as previously described, to lock the nut into position, the keeper teeth must align with the nut teeth. To do so, the nut may need to be loosened until the next preload mark 48 is vertically asserted or aligned with a marking of the preload adjustment apparatus 26. The distance between preload markings is pre-selected based upon nut thread pitch, the desired preload change when the nut is rotated between consecutive preload markings, and the maximum amount of distance required to rotate the nut so that the nut teeth 120 mesh with keeper teeth 32. However, this preselected distance is also based upon the amount of preload desired on the wheel hub and bearings. If a preload of four thousandths of an inch (or 6000 pounds) is desired, the distance between preload markings and nut teeth should be such that loosening of the nut by the distance between preload markings allows the final preload on the assembly to be within an acceptable tolerance or range of the desired final preload. Also, if a locking mechanism other than nut and keeper teeth are used, the distance between preload markings may be preselected based upon tolerances and/or requirements necessary to adjust the rotational position of the nut (in either direction) to allow the nut to be locked in position via the locking mechanism.

Thus, the lock nut of the present invention due in part to its use of a combination of endplay markings 52 and preload markings 48 may be used in situations where the bearing may be set to either final preload or endplay settings. In addition, the lock nut is useable in situations where setting of a bearing requires initial preload of a bearing and then subsequent final adjustment to an endplay range. In such situations, or any situation where preload adjustments are specified, the position of the preload markings is selected to increase or decrease the preload on the bearing by a specified amount by tightening or loosening the nut such distance, respectively. And, the nut (and its preload and endplay markings) can be customized to a particular wheel end assembly so that preload can be adjusted accurately by a particular amount by using the preload, markings when tightening or loosening the nut using just a wrench.

The lock nut may be fabricated from any one or more structural metals including, for example, carbon steel or stainless steel. The nut may be fabricated by machining from a billet or plate, by forging or casting and then finished machining, or fabricated by conventional powder metallurgy techniques. In one aspect, when formed by powder metallurgy, the material may be FC 0208, or its equivalent. Nut may also be surface hardened for example, induction hardened, carburized, or nitrided, among other surface hardening methods; in one aspect, the exposed surfaces on end of nut may be hardened, for example, induction hardened.

Although aspects of the present invention were described above with respect to their application to wheel hub assemblies, for example, truck wheel hub assemblies, it is understood that aspects of the present invention may be applied to any vehicle, machine, or component having at least one bearing.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

The invention claimed is:

1. A lock nut useable for setting a bearing to preload or endplay, comprising:

a nut threadably engageable onto an axle or spindle;

a locking mechanism engageable with the nut and configured to prevent rotation of the nut threaded onto the axle or spindle;

a plurality of preload markings circumferentially and equidistantly spaced apart on the nut, the distance between the preload marking corresponding to a preselected amount of preload applied or reduced on said bearing when the nut is (i) tightened to apply a preload force to said bearing or (ii) loosened to reduce a preload force on said bearing;

a plurality of endplay markings circumferentially spaced apart on the nut substantially regularly but non-equidistantly such that the endplay markings are located circumferentially at preload marking locations and form some of the preload markings, the distance between the endplay markings corresponding to a preselected amount of endplay increased or reduced in said bearing when the nut is (i) tightened to reduce endplay on the bearing or (ii) loosened to increase endplay in said bearing; and wherein said endplay markings are visually different than the preload markings that are not formed thereby, and the nut enables setting the bearing on the axle or spindle to either an endplay setting or a preload setting by adjusting the rotation of said nut according to the endplay markings or the preload markings.

2. The lock nut of claim 1 wherein the preload markings and endplay markings are located on the axially outer face of the nut.

3. The lock nut of claim 2 wherein the nut comprises a recessed surface adjacent the axially inner face.

4. The lock nut of claim 1 wherein the locking mechanism comprises a retaining ring.

5. The lock nut of claim 1 wherein the locking mechanism further comprises a keeper.

6. The lock nut of claim 5 further comprising:
the nut having a plurality of engaging teeth;
the keeper having a plurality of keeper teeth engageable with said plurality of engaging teeth of said nut to inhibit movement of said keeper relative to said nut when said plurality of engaging teeth engages said plurality of keeper teeth;
said keeper having a radially inner side configured to engage the axle or spindle to inhibit rotational movement of said nut relative to the axle or spindle when said plurality of engaging teeth engages said plurality of keeper teeth and said radially inner side engages the axle or spindle; and
the retaining ring secured to said keeper, said retaining ring engageable with said nut to hold said keeper axially such that said plurality of engaging teeth, said retaining ring extending continuously in an arc from a first outside end to a second outside end, said keeper located between said first end and said second end.

7. The lock nut of claim 6 wherein said inner side of said keeper comprises a shaft engaging member engageable in a shaft slot of the axle or spindle to inhibit rotational movement of said nut relative to the axle or spindle.

8. The lock nut of claim 7 wherein said nut comprises a slot and said retaining ring comprises at least one leg configured to be received in said slot.

9. The lock nut of claim 8 wherein said retaining ring is configured to hold said keeper axially relative to said nut such that said plurality of engaging teeth and said plurality of keeper teeth are engaged when said at least one leg is received in said slot.

10. The lock nut of claim 9 wherein said at least one leg comprises two legs elastically deformable toward one another to allow said retaining ring to be attached to said nut by inserting said two legs in said slot.

11. The lock nut of claim 10 wherein said nut comprises a shoulder portion and said keeper is received on said shoulder portion such that said keeper is axially supported by said shoulder portion.

12. The lock nut of claim 11 wherein said keeper teeth forms an arc having a first outer end and a second outer end, said keeper teeth extending from said first end to said second end, said retaining ring located axially between said keeper and said outer surface.

13. The lock nut of claim 12 wherein said nut further comprises a circumferential rim, said retaining ring located at an axial center of said outer surface and engaging said rim, said retaining ring holding said keeper axially such that said plurality of engaging teeth and said plurality of keeper teeth are engaged and such that said keeper abuts said shoulder.

14. The lock nut of claim 1 wherein some adjacent endplay markings of the plurality of endplay markings are circumferentially spaced apart from each other a first distance, and some other adjacent endplay markings of the plurality of endplay markings are circumferentially spaced apart from each other a second distance that is greater than the first distance.

15. The lock nut of claim 1 wherein the plurality of endplay markings comprise a plurality of sets of adjacent endplay markings that are circumferentially spaced apart from each other a first distance, and a plurality of sets of adjacent endplay markings that are circumferentially spaced apart from each other a second distance that is greater than the first distance.

16. The lock nut of claim 1 wherein the plurality of endplay markings are circumferentially spaced apart from each other either a first distance or a second distance that is greater than the first distance.

17. The lock nut of claim 1 wherein the distances between the endplay markings is greater than the distances between the preload markings.

18. A method for providing a lock nut useable for setting a bearing to preload or endplay, comprising:
providing a nut threadably engageable onto an axle or spindle;
providing a locking mechanism engageable with the nut and configured to prevent rotation of the nut threaded onto the axle or spindle;
providing a plurality of preload markings circumferentially and equidistantly spaced apart on the nut, the distance between the preload marking corresponding to a preselected amount of preload applied or reduced on said bearing when the nut is (i) tightened to apply a preload force to said bearing or (ii) loosened to reduce a preload force on said bearing, respectively;
providing a plurality of endplay markings circumferentially spaced apart on the nut substantially regularly but non-equidistantly such that the endplay markings are located circumferentially at preload marking locations and form some of the preload markings, corresponding to a preselected amount of endplay increased or reduced in said bearing when the nut is (i) tightened to reduce endplay on the bearing or (ii) loosened to increase endplay in said bearing; and
wherein said endplay markings are visually different the preload markings not formed thereby, and the nut enables setting the bearing on the axle or spindle to either an endplay setting or a preload setting by adjusting the rotation of said nut according to the endplay markings or the preload markings, respectively.

19. The method of claim 18 wherein the preload markings and endplay markings are provided on the axially outer face of the nut.

20. The method of claim 19 wherein the nut is provided with a recessed surface adjacent the axially inner face.

21. The method of claim 20 wherein the locking mechanism includes a retaining ring.

22. The method of claim 21 further comprising:
providing the nut with a plurality of engaging teeth;
providing the keeper with a plurality of keeper teeth engageable with said plurality of engaging teeth of said nut to inhibit movement of said keeper relative to said nut when said plurality of engaging teeth engages said plurality of keeper teeth;
providing the keeper with a radially inner side configured to engage the axle or spindle to inhibit rotational movement of said nut relative to the axle or spindle when said plurality of engaging teeth engages said plurality of keeper teeth and said radially inner side engages the axle or spindle; and
providing the retaining ring secured to said keeper, said retaining ring engageable with said nut to hold said keeper axially such that said plurality of engaging teeth, said retaining ring extending continuously in an arc from a first outside end to a second outside end, said keeper located between said first end and said second end.

23. A lock nut useable for setting a bearing to preload or endplay, comprising:
- a nut threadably engageable onto an axle or spindle;
- a locking mechanism engageable with the nut and configured to prevent rotation of the nut threaded onto the axle or spindle;
- a plurality of preload markings circumferentially and equidistantly spaced apart on the nut, the distance between the preload marking corresponding to a preselected amount of preload applied or reduced on said bearing when the nut is (i) tightened to apply a preload force to said bearing or (ii) loosened to reduce a preload force on said bearing;
- a plurality of endplay markings circumferentially spaced apart on the nut non-equidistantly, the distance between the endplay markings corresponding to a preselected amount of endplay increased or reduced in said bearing when the nut is (i) tightened to reduce endplay on the bearing or (ii) loosened to increase endplay in said bearing; and
- wherein said endplay markings are visually different than at least a portion of said preload markings, and the nut enables setting the bearing on the axle or spindle to either an endplay setting or a preload setting by adjusting the rotation of said nut according to the endplay markings or the preload markings.

* * * * *